United States Patent [19]

Steck et al.

[11] Patent Number: 4,755,315
[45] Date of Patent: Jul. 5, 1988

[54] PREPARATION OF COBALT-CONTAINING ISOTROPIC MAGNETIC IRON OXIDES

[75] Inventors: Werner Steck, Ludwigshafen; Rainer Feser, Hessheim; Helmut Jakusch, Frankenthal; Peter Rudolf, Neuhofen; Guenter Vaeth, Limburgerhof; Udo Kullmann, Dirmstein, all of Fed. Rep. of Germany

[73] Assignee: BASF Aktiengesellschat, Fed. Rep. of Germany

[21] Appl. No.: 14,172

[22] Filed: Feb. 12, 1987

Related U.S. Application Data

[63] Continuation of Ser. No. 722,142, Apr. 11, 1985, abandoned.

[30] Foreign Application Priority Data

Apr. 12, 1984 [DE] Fed. Rep. of Germany ....... 3413752

[51] Int. Cl.[4] ............................................. C01G 49/06
[52] U.S. Cl. .................................................. 252/62.56
[58] Field of Search ...................................... 252/62.56

[56] References Cited

U.S. PATENT DOCUMENTS

| 3,052,567 | 9/1962 | Gabor | 117/76 |
| 3,117,933 | 1/1964 | Abeck et al. | 252/62.56 |
| 3,897,354 | 7/1975 | Woditsch et al. | 252/62.56 |
| 3,974,079 | 8/1976 | Woditsch et al. | 252/62.56 |
| 4,297,395 | 10/1981 | Buxbaum et al. | 427/127 |

FOREIGN PATENT DOCUMENTS 57-197809 12/1982 Japan ............... 252/62.56

Primary Examiner—Jack Cooper
Attorney, Agent, or Firm—Keil & Weinkauf

[57] ABSTRACT

A process for the preparation of cobalt-containing isotropic magnetic iron oxides which are based on gamma-iron(III) oxide, contain from 2 to 7% by weight of cobalt(II) ions and less than 2% by weight of Fe(II) ions, the percentages in each case being based on the iron oxide, and have a particle length of from 0.08 to 0.30 μm, a length/width ratio of from 1.5 to 3.5:1 and a specific remanent magnetization after saturation of not less than 60 nTm$^3$/g.

1 Claim, No Drawings

PREPARATION OF COBALT-CONTAINING ISOTROPIC MAGNETIC IRON OXIDES

This application is a continuation of application Ser. No. 722,142, filed on Apr. 11, 1985, now abandoned.

The present invention relates to a process for the preparation of cobalt-containing isotropic magnetic iron oxides which are based on gamma-iron(III) oxide, contain from 2 to 7% by weight of cobalt(II) ions and less than 2% by weight of Fe(II) ions, the percentages in each case being based on the iron oxide, and have a particle length of from 0.08 to 0.30 μm, a length/width ratio of from 1.5 to 3.5:1 and a specific remanent magnetization after saturation of not less than 60 nTm$^3$/g.

The development of magnetic recording media has long been directed toward high-density recording, particularly in order to meet the requirements of data and video signal storage. Recording materials which are regarded as being particularly suitable for this purpose are those which have extremely smooth surfaces and are based on magnetic materials which are finely dispersed in organic binders and have very high coercive forces. The recording wavelength decreases as the recording density increases, and consequently the reduction in signal output as a result of self-demagnetization of the recording layer becomes increasingly marked. Although it is possible to reduce the demagnetization by decreasing the layer thickness, in the case of recording media possessing binder layers containing magnetic powder, not only the reduction in the amount of magnetic material present per unit area, ie. in the residual induction of the layer, but also coating techniques impose limits on this measure. In another attempt to solve the problem of obtaining sufficient magnetization with thin layers, recording materials based on thin magnetic metal films have been proposed. However, the production of such homogeneous metal layers poses problems, and in particular mechanical problems arise during their use.

Because of the difficulties described, and in an attempt nevertheless to provide magnetic recording systems which have a high recording density coupled with high output levels, recording at right angles to the recording medium has also been proposed. For this purpose, the recording media have to possess layers which permit perpendicular magnetization at least in that area of the layer which is closest to the head (U.S. Pat. No. 3,052,567). In the further development of this principle, a number of different magnetic layers which exhibit magnetic anisotropy at right angles to the surface of the base, and are usually in the form of Co/Cr layers have been investigated. However, neither their production nor the properties obtainable are satisfactory. A further substantial problem has been the development of a head suitable for the recording method.

Utilizing the vertical component of the magnetic field used for recording was regarded as another way of increasing the recording density while achieving high sensitivity. Here, the vertical component of a magnetic field generated by an annular head on the surface of the magnetic layer is utilized, this component being particularly effective at high recording densities. Suitable magnetic materials for such recording systems are products which give high relative remanence in all directions of the recording medium. Isotropic magnetic materials, in particular those based on the known cobalt-doped cubic iron oxides, are useful for this purpose. The preparation of such magnetic iron oxides, which are either isometric or highly anisometric, is known, as is the preparation of cobalt-doped anisometric iron oxides, doping being uniform throughout the particles (German Pat. No. 1,226,997, German Published Application DAS No. 2,221,218 and German Laid-Open Application DOS No. 2,903,593).

However, these materials have the disadvantage that they are unsuitable for use in magnetic recording media, either because of their magnetic properties, in particular the high specific remanence and narrow switching field distribution, or because of the instability of these properties when the material is exposed to heat or subjected to mechanical stress, or because of the unfavorable particle shape, i.e. the acicular shape is either too pronounced or completely absent.

It is an object of the present invention to provide a process for the preparation of isotropic magnetic iron oxides, which on the one hand can be carried out in a simple and economical manner using conventional raw materials, and on the other hand gives a magnetic material which exhibits isotropic magnetization, in particular a high isotropic specific remanence, and the necessary high coercive force for recording media and in which the individual magnetizable particles have, in particular, a particularly narrow switching field distribution and an advantageous shape, which leads to a compromise between crystal anisotropy and shape anisotropy.

We have found that this object is achieved by a process for the preparation of a cobalt-containing isotropic magnetic iron oxide which is based on gamma-iron(III) oxide, contain from 2 to 7% by weight of cobalt-(II) ions and less than 2% by weight of iron(II) ions, the percentages in each case being based on the iron oxide, and has particle length of from 0.08 to 0.30 μm, a length/width ratio of from 1.5 to 3.5:1 and a specific remanent magnetization after saturation of not less than 60 nTm$^3$/g, if a cobalt-containing α-FeOOH is first prepared by reacting iron(II) sulfate in the presence of cobalt(II) and phosphate ions in an acidic aqueous phase in the conventional manner, the resulting product is filtered off, washed, dried and then reduced to cobalt-containing magnetite by heating in a reducing atmosphere, and the said magnetite is then oxidized in an oxygen-containing atmosphere to give the cobalt-containing iron oxide.

In the first stage of the conventional method of preparing α-FeOOH, α-FeOOH seeds are produced, by partial precipitation of iron(II) hydroxide from an iron-(II) sulfate solution by means of an alkali and subsequent oxidation by an oxygen-containing gas, until the pH of the suspension is less than 4. These seeds then grow in the second stage at a pH of from 4 to 5.5 to give the α-FeOOH end product, alkali being added continuously and an oxygen-containing gas being passed through.

According to the invention, this process is carried out in the presence of both cobalt(II) and phosphate ions. The amount of cobalt(II) ions is so chosen that the end product contains from 2 to 7% by weight of cobalt, while the amount of phosphate ions in the suspension is advantageously kept at from 0.3 to 1.2% by weight, likewise based on the end product. In carrying out the process, it has proven advantageous to keep the temperature at from 20° to 50° C. in the two precipitation stages, to precipitate from 20 to 50% of the divalent metal ions in the first stage in which formation of the FeOOH seeds takes place, and to bring the pH to 4.5–5.5 in the second stage. Moreover, it is advisable to so chose the concentration of the suspension that the total concentration of the iron(II) and cobalt(II) ions is from 15 to 45 g per liter, corresponding to 25–70 g of cobalt-containing α-FeOOH per liter.

The phosphate ions are added in the form of primary and/or secondary and/or tertiary alkali metal and/or ammonium salts of orthophosphoric acid.

When the synthesis is complete, the pH of the cobalt-containing α-FeOOH suspension is brought to 8–12 with an alkali in order to completely precipitate, as $Co(OH)_2$, any Co(II) ions still present. When stirring has been continued for from 10 to 240 minutes, the Co-containing α-FeOOH is filtered off and washed with water until the filtrate is sulfate-free. The washed filter cake is then dried at from 50° to 180° C. under reduced or atmospheric pressure.

The cobalt-containing α-FeOOH is then reduced in a conventional manner in a reducing atmosphere, eg. with hydrogen and/or carbon monoxide and/or by means of an organic substance which decomposes in the presence of iron oxides, to give cobalt-containing magnetite, the simultaneous presence of steam being advantageous in each case in order to avoid reduction to metallic phases. Depending on the reducing agent and the reduction time, which may be from 10 minutes to about 2 hours, reduction temperatures of from 380° to 580° C. have proven useful. Reduction with hydrogen as the sole reducing agent, at from 380° to 500° C. and for from 15 to 90 minutes, gives particularly advantageous results. If the reduction is carried out completely or partially by means of an organic substance which decomposes in the presence of iron oxides, the organic substance can be added to the fresh suspension of the cobalt-containing α-FeOOH or to the dry product. Reduction by means of an organic substance in the presence of a tin compound as described in German Laid-Open Application DOS No. 3,204,547 has proven particularly advantageous.

The Co-containing magnetite obtained as an intermediate can be oxidized in a conventional manner with an oxidizing gas, eg. oxygen or air, at about 250°–500° C. Depending on the particular oxidation temperature, oxidation times of from 10 minutes to 2 hours have proven advantageous. However, to achieve a high specific remanence of the pigment, complete oxidation, which results in a gamma-iron(III) oxide with a very low Fe(II) content, is desirable. Moreover, the oxidation conditions chosen should be such that the known irreversible transformation of $\gamma$-$Fe_2O_3$ to $\alpha$-$Fe_2O_3$ is avoided.

The cobalt-containing iron oxides prepared according to the invention and based on gamma-iron(III) oxide exhibit a high coercive force and a narrow switching field distribution coupled with, in particular, a high isotropic specific remanent magnetization. To the crystal anisotropy due to the cobalt ions, there is imparted a weak shape anisotropy component which results from the low length/width ratio and has an advantageous effect on the sensitivity, otherwise present, of the magnetic properties under thermal or mechanical stress, without however resulting in orientation of the particles, which would adversely affect the production of isotropic recording media.

The cobalt-containing isotropic magnetic iron oxides prepared according to the invention are essentially intended to be used as a magnetic material in the production of magnetic recording media. Surprisingly, they enable the recording characteristics which are influenced by the coercive force and switching field distribution to be modified in an advantageous manner. With their high relative remanence in all three orthogonal directions, they can be particularly advantageously used in the production of magnetic recording media where the advantages of recording by means of the effective vertical component are to be utilized for increasing bit density and recording high frequencies.

The recording media are produced in a conventional manner, the magnetic materials being dispersed in polymeric binders. Suitable binders are compounds conventionally used for this purpose, such as homopolymers and copolymers of polyvinyl derivatives, polyurethanes, polyesters, and the like. The binders are used in solution in suitable organic solvents which can, if required, contain further additives. The magnetic layers are applied to rigid or flexible bases, such as disks, plastic films or cards.

The Examples which follow illustrate the present invention; the Comparative Experiments represent the state of the art. The stated contents of Co(II) or Fe(II) in percent are % by weight, based on the total compound. The magnetic properties of the powder samples were measured with a vibrating sample magnetometer in a magnetic field of 160 kA/m or, after magnetization to saturation in a discharge capacitor, in a vibrating sample magnetometer, the coercive force $H_c$, measured in [kA/m], being based on a tamped density $\delta = 1.2$ g/cm$^3$. The specific remanence ($M_r/\delta$) and the specific saturation magnetization ($M_m/\delta$) are each expressed in [nTm$^3$/g]. The saturation magnetization and the residual induction of the tapes are given in [mT].

The switching field distribution (SFD) is a measure of the magnetic homogeneity of a recording layer which in general consists of magnetizable single particles. It indicates the magnetic field range within which the magnetization of the individual particles is reversed. The switching field distribution of a magnetic recording layer plays a decisive role in the recording of short wavelengths (high frequencies). A narrow SFD reduces the distance between areas of opposite magnetization and hence permits a high recording density.

(1-S*) serves as the quantity for measuring the SFD, and is obtained from the slope of the hysteresis curve at $M=0$ (ie. $H_c$) in accordance with the equation $dM/dH = M_R/(1-S^*) \times H_c$ (M. L. Williams and R. L. Comstock, AIP Conf. Proc. 5 (1971) 738).

The specific surface area $S_{N2}$ of the pigments was determined by the BET method and is expressed in m$^2$/g, ie. nitrogen is adsorbed onto weighed gas-free pigment samples which have been subjected to reduced pressure. The difference in the amount of nitrogen before and after adsorption is converted into occupied area and related to the sample weight.

EXAMPLE 1A

In a 10 l glass vessel provided with a reflux condenser, a stirrer and a pH electrode, 1,151 g of $FeSO_4.7H_2O$ and 67.1 g of $CoSO_4.7H_2O$ were dissolved in water while stirring (300 rpm), the amount of water used being such that the total volume of the solution was 6 l, and 3.2 ml of concentrated sulfuric acid were added, followed by 5.4 g of $NaH_2PO_4.2H_2O$. At the same time, the solution was gassed with 300 l (S.T.P.)/h of nitrogen, and the temperature brought to 50° C., after which 575 ml of 15.7% strength sodium hydroxide solution were added in the course of 10 minutes. The degree of precipitation was 30%, based on Me(II).

600 l (S.T.P.)/h of air were then passed in, instead of nitrogen, until the pH had decreased to less than 4, which took 50 minutes. 10 minutes later, the pH was brought to 5.1 by the dropwise addition of 15.7% strength sodium hydroxide solution at 50° C., while continuing to pass in air and stirring, and was kept at 5.1-5.2 during the entire growth phase, which lasted about 115 minutes. The suspension was then cooled to 30° C. and brought to pH 9.5 with 15.7% strength sodium hydroxide solution. Stirring was continued for 2 hours, after which the mixture was filtered, and the filter cake was washed with water until the filtrate was sulfate-free. Finally, the filter cake was dried at 110° C. The properties of the α-FeOOH sample 1A obtained in this manner are shown in Table 1.

EXAMPLES 1B TO 1I

The procedure described in Example 1A was followed, except that the ratio of iron(II) ions to cobalt(II) ions was modified as shown in the Table. The content of phosphate ions was 0.8% by weight in each case.

TABLE 1

| Example 1 | FeSO$_4$.7H$_2$O [g] | CoSO$_4$.7H$_2$O [g] | [% by weight] Co (II)[2] | Duration of synthesis Nucleation phase [min] | Growth | S$_{N2}$ for Co—α-FeOOH [m$^2$/g] |
|---|---|---|---|---|---|---|
| A | 1,151 | 67.1 | 3.8 | 50 | 115 | 61 |
| B | 1,211 | 16.8 | 0.9 | 45 | 110 | 44 |
| C | 1,207 | 22.4 | 1.2 | 45 | 100 | 46 |
| D | 1,202 | 29.9 | 1.6 | 45 | 135 | 62 |
| E | 1,197 | 37.3 | 2.0 | 40 | 95 | 60 |
| F | 1,191 | 46.7 | 2.6 | 40 | 100 | 56 |
| G | 1,185 | 56.0 | 3.1 | 45 | 105 | 60 |
| H | 1,139 | 78.3 | 4.5 | 50 | 190 | 69 |
| I | 1,179 | 56.7[1] | 3.7 | 45 | 110 | 52 |

[1]Instead of CoSO$_4$.7H$_2$O, CoCl$_2$.6H$_2$O was used.
[2]Based on the theoretical amount of α-FeOOH which can be formed from the amount of FeSO$_4$.7H$_2$O specified in each case.

EXAMPLE 2A

In the glass apparatus described in Example 1A, 1,167 g of FeSO$_4$.7H$_2$O and 83.9 g of CoSO$_4$.7H$_2$O were dissolved in water with stirring, the amount of water used being such that the total volume of the solution was 6 l. Thereafter, 5.4 g of NaH$_2$PO$_4$.2H$_2$O were added and the temperature was brought to 40° C., after which 392 ml of a 15.3% strength sodium hydroxide solution were added in the course of 5 minutes. The degree of precipitation was 20%, based on Me(II).

Air was passed in and the Co-α-FeOOH nucleation carried out, the steps being carried out as described in Example 1A, nucleation lasting for 35 minutes. 10 minutes after completion of the nucleation phase, the growth phase was carried out in the course of 160 minutes at 40° C. and at pH 5.1-5.3, while continuing to pass in air and stirring. The mixture was cooled and the pH was brought to 9.5 with sodium hydroxide solution, the steps being carried out as described in Example 1.

Thereafter, the mixture was filtered and worked up as described in Example 1A. The properties of sample 2A are shown in Table 2.

EXAMPLES 2B AND 2C

The procedure described in Example 2A was followed, except that the Fe(II)/Co(II) ratio was varied as indicated in Table 2. Furthermore, in the case of Example 2B, the CoSO$_4$ was added 25 minutes after the beginning of the introduction of air during the nucleation phase. The results are shown in Table 2.

TABLE 2

| Example 2 | FeSO$_4$.7H$_2$O [g] | CoSO$_4$.7H$_2$O [g] | [% by weight] Co (II)[1] | Duration of synthesis Nucleation phase [min] | Growth | S$_{N2}$ for Co—α-FeOOH [m$^2$/g] |
|---|---|---|---|---|---|---|
| A | 1,167 | 83.9 | 4.7 | 35 | 160 | 103 |
| B | 1,131 | 93.2 | 5.4 | 50 | 145 | 77 |
| C | 1,112 | 111.9 | 6.6 | 50 | 165 | 97 |

[1]Based on the theoretical amount of —FeOOH which can be formed from the amount of FeSO$_4$.7H$_2$O specified in each case.

EXAMPLE 3

In the apparatus described in Example 1A, 1,179 g of FeSO$_4$.7H$_2$O and 67.1 g of CoSO$_4$.7H$_2$O were converted into cobalt-doped goethite in the presence of 5.4 g of NaH$_2$PO$_4$.2H$_2$O, as described in Example 1A. However, by using 1,071 ml of 14.8% strength NaOH, the degree of precipitation was brought to 50%, based on Me(II). The duration of nucleation was 75 minutes, while growth required 90 minutes. The resulting cobalt-containing α-FeOOH (sample 3) had an S$_{N2}$ value of 61 m$^2$/g.

EXAMPLE 4

The procedure described in Example 3 was followed, except that, instead of the sodium phosphate, 3.2 ml of and 85% strength phosphoric acid (H$_3$PO$_4$) were added. The duration of nucleation was 90 minutes, while growth required 65 minutes. The resulting cobalt-containing α-FeOOH (sample 4) had an S$_{N2}$ value of 70 m$^2$/g and a PO$_4^{3-}$ content of 1.05%, based on the total compound.

EXAMPLE 5

The procedure described in Example 1A was followed, except that the nucleation temperature was 30° C. and the temperature during the growth phase was 50° C. The duration of nucleation was 40 minutes, while growth lasted for 80 minutes. The $S_{N2}$ value (sample 5) was 90 m²/g.

COMPARATIVE EXPERIMENT 1

The procedure described in Example 1I was followed, except that the addition of phosphate ions was dispensed with. The duration of nucleation was 45 minutes, while growth lasted for 145 minutes. The cobalt-containing α-FeOOH (sample 6) had an $S_{N2}$ value of 48 m²/g, and electron micrographs (magnification 1:50,000) showed that it predominantly consisted of distinctly longer needles with a wide length range of from 0.35 to 0.6 μm and a large number of dendritic branches.

EXAMPLE 6

120 g, in each case, of cobalt-containing α-FeOOH from Examples 1A to 5, and from Comparative Experiment 1 were reduced in a tubular rotary kiln in the course of 30 minutes at 440° C. in a stream of 100 l (S.T.P.)/h of hydrogen to given cobalt-containing magnetite. Before entering the reduction tube, the stream of H₂ was passed through water at 60° C. When the reduction was complete, the magnetite sample was oxidized in a kiln of the same type in the course of 30 minutes, at 320° C., in a stream of 50 l (S.T.P.)/h of air to give cobalt-containing α-Fe₂O₃. Before being reduced, the sample 6/2 A was dehydrated and heated at 700° C. in the course of 30 minutes to give cobalt-containing α-Fe₂O₃ having an $S_{N2}$ value of 24.3 m²/g.

Table 3 shows the samples described in the various Examples and their respective properties.

TABLE 3

| Example Starting material | $H_c$ | $M_{R/\delta}$ | SFD | $S_{N2}$ | Mean particle length [μm] | Length/ width ratio |
|---|---|---|---|---|---|---|
| 6/1 A | 60.4 | 69 | 0.44 | 21 | 0.15 | 2.8 |
| 6/1 B | 21.0 | 42 | 0.56 | 18 | — | — |
| 6/1 C | 23.6 | 47 | 0.56 | 19 | — | — |
| 6/1 D | 27.5 | 51 | 0.55 | 22 | 0.17 | 2.7 |
| 6/1 E | 32.3 | 64 | 0.56 | 17 | 0.17 | 2.5 |
| 6/1 F | 42.3 | 62 | 0.50 | 18 | 0.15 | 2.3 |
| 6/1 G | 49.5 | 62 | 0.47 | 19 | 0.16 | 2.7 |
| 6/1 H | 68.2 | 62 | 0.43 | 25 | 0.13 | 3.0 |
| 6/1 I | 61.7 | 60 | 0.46 | 18 | 0.17 | 2.6 |
| 6/2 A | 72.3 | 72 | 0.46 | 22 | 0.09 | 2.3 |
| 6/3 | 61.3 | 62 | 0.45 | 21 | 0.17 | 3.3 |
| 6/4 | 58.7 | 62 | 0.45 | 25 | 0.16 | 3.0 |
| 6/5 | 67.1 | 65 | 0.46 | 23 | 0.16 | 2.6 |
| Comparative Experiment | 66.8 | 58 | 0.52 | 15 | 0.32 | 3.9 |

EXAMPLE 7

80 g of the material from Example 1A were reduced in a tubular rotary kiln under the conditions stated in Table 4, in the course of 30 minutes, and then oxidized at 320° C., as described in Example 6.

TABLE 4

| Example | Reducing agent and reduction conditions | $H_c$ | $M_{R/\delta}$ | SFD | $S_{N2}$ | mean particle Length [μm] | Length/ width ratio |
|---|---|---|---|---|---|---|---|
| 7/1 | 100 l (S.T.P.) /h of H₂, passed through water at 60° C.; 440° C. | 60.4 | 69 | 0.44 | 21 | 0.15 | 2.8 |
| 7/2 | as for 7/1, but at 480° C. | 57.0 | 60 | 0.53 | 18 | 0.14 | 2.3 |
| 7/3 | cobalt-containing α-FeOOH mixed with 2.5% by weight of a high molecular weight polyethylene (MW 250,000) and reduced at 520° C. in a stream of 10 l (S.T.P.)/h of nitrogen | 58.9 | 60 | 0.42 | 27 | 0.14 | 3.3 |
| 7/4 | cobalt-containing α-FeOOH mixed with 2.5% by weight of stearic acid and reduced in a gas mixture consisting of 100 l (S.T.P.)/h of N₂ and 100 l (S.T.P.)/h of H₂, 440° C. | 60.6 | 63 | 0.47 | 23 | 0.15 | 2.8 |

EXAMPLE 8

Example 1A was repeated, except that, after the pH had been brought to 9.5 at the end of the synthesis, 10.7 ml of olive oil were added to the suspension of the cobalt-containing α-FeOOH, and stirring was continued for one hour. The product was filtered off, washed and dried at 110° C., and the measured $S_{N2}$ value was 47 m²/g (sample 8).

120 g of sample 8 were then reduced in a tubular rotary kiln at 480° C. in the course of 30 minutes in a stream of 100 l (S.T.P.)/h of hydrogen which had been passed beforehand through water at 60° C., and the product was then oxidized at 320° C. (sample 8A) or 380° C. (sample 8B) in the course of 30 minutes in a stream of 50 l (S.T.P.)/h of air. The results are shown in Table 5.

TABLE 5

| Sample | $H_c$ | $M_{R/\delta}$ | SFD | $S_{N2}$ | mean particle length [μm] | length/ width ratio | Fe (II) content in % by weight |
|---|---|---|---|---|---|---|---|
| 8 A | 64.8 | 58 | 0.63 | 20 | 0.15 | 2.4 | 6.5 |
| 8 B | 71.9 | 64 | 0.43 | 19 | 0.15 | 2.4 | 1.8 |

EXAMPLE 9

50 parts, in each case, of the isotropic magnetic iron oxides stated in Table 6, 3 parts of a long-chain amphoteric organophilic dispersant, 0.05 part of a silicone oil, 0.5 part of a mixture of isomeric carboxylic acids, 6.6 parts of a commercial isocyanate-free polyester-urethane obtained from adipic acid, butane-1,4-diol and 4,4-dicyanatodiphenylmethane and having a K value of 61 (measured as a 1% strength solution in tetrahydrofuran), and 25 parts of a vinyl chloride/methyl maleate copolymer having a K value of 59 (likewise measured as a 1% strength solution in tetrahydrofuran) and 78 parts of a mixture of equal amounts of tetrahydrofuran and 1,4-dioxane were introduced into a ball mill having a capacity of 250 parts by volume and charged with 100 parts of steel balls 2 mm in diameter. The stated binders were introduced in the form of their solutions in the stated solvent mixture. After dispersing had been carried out for 3.5 hours, the magnetic dispersion was filtered and then applied to a 12 μm thick polyethylene terephthalate film using a conventional coating apparatus, so that, after drying in a tunnel dryer and subsequent calendering on a multiroll calender heated to 80° C., a layer having thickness of 5.2 μm was obtained. The magnetic properties of the magnetic layer are shown in Table 6.

TABLE 6

| Iron oxide samples used | $H_c$ [kA/m] | $M_R$ [mT] | SFD | Mr/Ms |
| --- | --- | --- | --- | --- |
| 6/1 D | 25.9 | 145 | 0.40 | 0.75 |
| 6/1 E | 31.2 | 163 | 0.31 | 0.81 |
| 6/1 F | 40.2 | 160 | 0.33 | 0.84 |
| 6/1 G | 47.8 | 163 | 0.28 | 0.85 |
| 6/1 A | 61.6 | 150 | 0.29 | 0.86 |
| 8 A | 62.2 | 135 | 0.53 | 0.76 |
| 8 B | 68.5 | 155 | 0.32 | 0.85 |

We claim:

1. A process for the preparation of a cobalt-containing isotropic magnetic gamma-iron(III) oxide containing from 2 to 7% by weight of cobalt(II) ions and less than 2% by weight of Fe(II)ions, the percentages in each case being based on the gamma-iron(III) oxide, and having a particle length of from 0.08 to 0.30 μm, a length/width ratio of from 1.5 to 3.5 and a specific isotropic remanent magnetization after saturation of not less than 60 nTm$^3$/g, which process comprises:

in a first step, producing a suspension of cobalt-containing α-FeOOH seeds by partial precipitation of iron(II) hydroxide from an iron(II) sulfate solution in the presence of both cobalt(II) and phosphate ions by adding an alkali to the solution and subsequently adding an oxygen-containing gas at a temperature of from 20° to 50° C. until the pH of the suspension is less than 4, said partial precipitation being from about 20 to 50% of the iron(II) and cobalt(II) ions, the total concentration of the iron(II) and cobalt(II) ions is from about 15 to 45 g/liter, the amount of cobalt(II) ions is such that the gamma-iron(III) oxide contains about 2 to 7% by weight of cobalt and the amount of phosphate ions based on the gamma-iron(III) oxides is about from 0.3 to 1.2% by weight, and in a second step causing the cobalt-containing α-FeOOH seeds to grow into cobalt-containing α-FeOOH end product at the said temperature and at a pH of from 4 to 5.5 by adding alkali and further oxygen-containing gas, adding alkali at the completion of this growth step to increase the pH to 8 to 12 to completely precipitate as Co(OH)$_2$ any cobalt(II) ions still present, filtering off, washing and drying the resulting product and then reducing the product to cobalt-containing magnetite by heating in a reducing atmosphere, the said magnetite then being oxidized in an oxygen-containing atmosphere at about 250° to 500° C. to give the cobalt-containing gamma-iron(III) oxide.

* * * * *